United States Patent Office 3,121,755
Patented Feb. 18, 1964

3,121,755
ANTHRAQUINONE DYES CONTAINING AN ALPHA - HALOTOSYLAMIDO OR ALPHA - HALOTOLUYLAMIDO SUBSTITUENT
Willy Braun, Heidelberg, and Hermann Weissauer, Ludwigshafen (Rhine), Germany, assignors to Badische Anilin- & Soda-Fabrik Aktiengesellschaft, Ludwigshafen (Rhine), Germany
No Drawing. Filed Sept. 20, 1960, Ser. No. 57,128
Claims priority, application Germany Sept. 26, 1959
3 Claims. (Cl. 260—372)

This invention relates to new dyes which contain in the molecule at least one aminoanthraquinone radical and at least one α-halogenalkylarylcarbonyl or α-halogenalkylarylsulfonyl radical.

The new valuable dyes have the general formula:

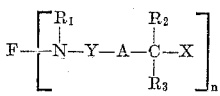

in which F represents the radical of an anthraquinone dye, A represents an arylene radical which may bear further substituents, X represents a halogen atom, $R_1$, $R_2$ and $R_3$ represent hydrogen atoms or alkyl radicals, Y represents a —CO— or —$SO_2$— group and $n$ represents a whole number which is greater than 1 or equal to 1.

The novel anthraquinone dyes of this invention are water-soluble and can be more specifically designated by the formula

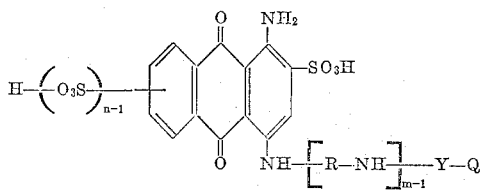

wherein:
R represents a member selected from the class consisting of ethylene, monosulfo-1,4-phenylene and monosulfo-1,3-phenylene;
Y represents a member selected from the class consisting of carbonyl and sulfonyl;
Q represents a member selected from the class consisting of

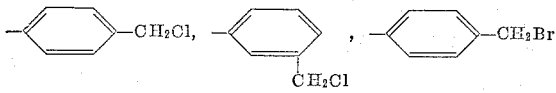

and

and each of $m$ and $n$ represents an integer of 1 to 2.

The new anthraquinone dyes are obtained by reacting an α-halogenalkylarylcarboxylic acid halide or sulfonic acid halide with an anthraquinone dye which contains one or more than one primary and/or secondary amino group.

Examples of α-halogenalkylarylcarboxylic or -sulfonic acid halides are α-halogenalkyl derivatives of benzene, diphenyl and naphthalene carboxylic and sulfonic acid halides which may bear other substituents in the aryl radical, such as alkyl, cycloalkyl, aralkyl, hydroxyalkyl, aryl, alkoxy, nitro, or acylamino groups and/or halogen atoms, such as 1-chlormethylbenzene-2-carboxylic acid chloride, 1-chlormethylbenzene-3-carboxylic acid chloride, 1-chlormethylbenzene-4-carboxylic acid chloride, 1-chlormethylbenzene-4-sulfonic acid chloride, 1-bromomethylbenzene-2-carboxylic acid bromide, 1-bromomethylbenzene-3-carboxylic acid bromide, 1-bromomethylbenzene-4-carboxylic acid bromide, 1-bromomethylbenzene-4-carboxylic acid chloride, 2-bromomethylnaphthalene-1-carboxylic acid chloride and 1-(α,β-dibromomethyl)-benzene-3-carboxylic acid bromide. The α-halogenalkyl groups may accordingly be in ortho, meta, or para position relative to the carboxylic acid halide or sulfonic acid halide group on the benzene nucleus. As already mentioned, the benzene nucleus may bear further substituents in addition to the said substituents. If the said further substituents are alkyl, hydroxyalkyl, alkoxy or acylamino groups, preference is for industrial reasons given to those with a small number of carbon atoms, e.g., methyl, ethyl, propyl or butyl groups as well as the corresponding alkoxy and acyl groups.

The α-halogenalkylaryl carboxylic and sulfonic acid halides can be prepared by the usual methods, for example by treatment of alkyl-aryl carboxylic or sulfonic acid chlorides with chlorine, or treatment of alkyl-aryl carboxylic or sulfonic acids with chlorine and conversion of the α-chloralkyl-aryl carboxylic or sulfonic acids into their halides, or by chlormethylation of aryl carboxylic or sulfonic acids and conversion of the reaction products into their halides.

The water-soluble anthraquinone dyes used for the production of the new dyes must contain at least one primary or secondary amino group.

Dyes of the anthraquinone series containing amino groups are for example 1,4-diaminoanthraquinone-2-sulfonic acid, 1,4-diaminoanthraquinone-2,5- and -2,6-disulfonic acid, 1,5-diaminoanthraquinone-2-sulfonic acid, the unilateral reaction products of 1-amino-4-bromanthraquinone-2-sulfonic acid, 1-amino-4-bromanthraquinone-2-carboxylic acid or 1-amino-4-bromanthraquinone-2,5- or -2,6-disulfonic acid with aromatic diamines, such as 1,3- and 1,4-diaminobenzene, 1,3-diaminobenzene-4-sulfonic acid and 1,4-diaminobenzene-2-sulfonic acid, 2,5-diaminobenzene-1,3-disulfonic acid, 4,4'-diaminodiphenyl-sulfide-2,2'-disulfonic acid, 4,4'-diaminostilbene-2,2'-disulfonic acid, 4,4'-diaminobiphenyl-2,2'-disulfonic acid, 4,4'-diaminodiphenylamine and 4,4'-diaminobiphenyl-3-sulfonic acid or aliphatic diamines, such as ethylene diamine or propylene diamine.

Further suitable initial dyes are obtainable for example by reaction of leuco-1,4-diaminoanthraquinone or leuco-1,4-dihydroxyanthraquinone with aromatic diaminosulfonic acids, such as 1,3- and 1,4-diaminobenzene sulfonic acids, 4,4'-diaminobiphenyl-2-sulfonic acid or 4,4'-diaminobiphenyl-2,2'-disulfonic acid. The list shows that the preferred initial materials for the production of the new dyes are those anthraquinone derivatives which contain in at least one α-position of the anthraquinone nucleus a primary or secondary amino group and which moreover contain a water-solubilizing group in the molecule. By water-solubilizing groups we understand anionic groups, preferably sulfonic acid groups. Water-solubilizing groups being effective also, for example when present in the α-halogenalkylarylcarbonyl or sulfonyl radical, water-soluble dyes are obtained even when dyes are prepared in accordance with the present invention that are free from carboxylic acid or sulfonic acid radicals in the anthraquinone radical itself.

$n$ preferably has a value 1 or 2, but it may also stand for 3 or 4. If the anthraquinone dye contains several acylatable amino groups, they may be partly or wholly reacted with the said α-halogenarylcarbonyl or α-halogenaryl-sulfonyl derivatives. Mixtures of the said acyl compounds may also be reacted with an anthraquinone derivative.

As far as the new dyes contain acid groups, for example sulfonic acid or carboxylic acid groups, they may be applied in the form of their free acids or in the form of their salts. Alkalies yielding the sodium or potassium salts are preferred for the formation of the salts.

The constitution of the new dyes may also be that the α-halogenalkylarylacyl radicals are not combined with amino groups which are directly attached to anthraquinone radicals but with amino groups directly attached to the anthraquinone molecule by way of an aryl radical. Preferred aryl radicals of this type are mononuclear aryl radicals such as phenylene and substituted phenylene radicals. Examples of substituents are sulfonic acid groups.

The reaction of the α-halogenalkylaryl carboxylic or sulfonic acid halides with the said anthraquinone dyes is carried out, for example, in aqueous solution or suspension at room temperature or slightly elevated temperature, advantageously in the presence of acid-binding agents, such as sodium hydroxide, potassium hydroxide, sodium carbonate, potassium carbonate, sodium hydrogen carbonate, sodium acetate, pyridine and triethylamine. To increase the solubility of the reactants, organic liquids, such as alcohols, ketones, acetic acid, dimethylformamide or N-methylpyrrolidone may be coemployed.

The new dyes are suitable for dyeing and printing textile materials and shaped articles such as fibers, films, sheets, flock, filaments, threads, woven fabrics, knitted fabrics and fleeces of wool, silk, leather and synthetic polyamides and polyurethanes and especially of native or regenerated cellulose.

Dyeings with very good fastness, especially wet and light fastness, are obtained.

The following examples will further illustrate this invention but the invention is not restricted to these examples. The parts and percentages, unless otherwise specified, are parts by weight. Parts by volume bear the same relation to parts by weight as the liter to the kilogram under normal conditions.

*Example 1*

20.8 parts of 3-chlormethylbenzene-1-carboxylic acid chloride are allowed to flow in the course of an hour into a solution of 48.9 parts of 1-amino-4-(3-sulfo-4-aminophenylamino)-anthraquinone-2-sulfonic acid in 1000 parts of water, the pH of the mixture being maintained at 4.5 by adding 10% aqueous sodium carbonate solution. The mixture is stirred for another five hours and the dye formed then precipitated with excess sodium chloride or potassium chloride, filtered off and dried at 45° C. under reduced pressure.

A cotton fabric is padded with an aqueous solution which contains 20 parts of this dye in 1000 parts by volume, squeezed to a moisture content of 90% and dried. The fabric is then led through a second aqueous padding bath which contains 15 parts of sodium hydroxide and 200 parts of sodium chloride in 1000 parts by volume, squeezed out, steamed for five minutes at 100° C. and soaped. A blue dyeing of excellent wet fastness is obtained.

*Example 2*

33.2 parts of 4-chlormethylbenzene-1-carboxylic acid chloride are allowed to flow during half an hour into a solution of 48.9 parts of the anthraquinone derivative of Example 1 in 1000 parts of water and the pH of the mixture maintained at about 5 by adding anhydrous sodium acetate. After stirring for four hours, the dye is worked up as in Example 1. It dyes cotton in the presence of basic-reacting substances blue shades of excellent wet fastness.

*Example 3*

33.2 parts of 3-chlormethylbenzene-1-carboxylic acid chloride are allowed to flow at 0° to 5° C. during an hour into a solution of 53.3 parts of the sodium salt of 1-amino-4-(4-sulfo-3-aminophenylamino)-anthraquinone-2-sulfonic acid in 1000 parts of water and the pH of the mixture is maintained at about 7 to 8 by adding sodium hydrogen carbonate. The mixture is stirred for several hours until the pH no longer changes without adding sodium hydrogen carbonate, and worked up as described in Example 1. The dye obtained dyes cotton blue shades of good wet fastness in the presence of basic-reacting substances.

Dyes of similar properties are obtained by using 4-chlormethylbenzene-1-carboxylic acid chloride, 4-chlormethylbenzene-1-sulfonic acid chloride or 3- or 4-bromomethylbenzene-1-carboxylic acid bromide instead of 3-chlormethylbenzene-1-carboxylic acid chloride.

Other similar dyes are obtained in the same way from the anthraquinone derivatives and the acid chlorides of the following table:

| Example | Anthraquinone dye | Acid chloride | Color |
|---|---|---|---|
| 4 | 1,4-diamino-anthraquinone-2-sulfonic acid (NH₂ groups at 1,4; SO₃H at 2) | ClOC—C₆H₄—CH₂Cl | violet. |
| 5 | 1,4-diamino-anthraquinone-2,6-disulfonic acid | ClOC—C₆H₄(CH₂Cl) | Do. |
| 6 | 1,5-diamino-anthraquinone-2-sulfonic acid | ClOC—C₆H₄—CH₂Cl | red. |

| Example | Anthraquinone dye | Acid chloride | Color |
|---|---|---|---|
| 7 | 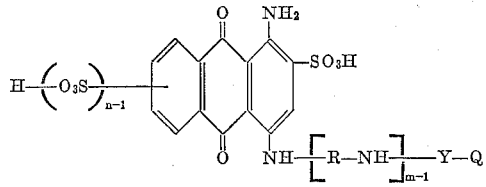 | ClO₂S—⟨ ⟩—CH₂Cl | blue. |
| 8 | | ClO₂S—⟨ ⟩—CH₂Cl | Do. |
| 9 | | ClOC—⟨ ⟩(CH₂Cl) | violet. |
| 10 | | ClOC—⟨ ⟩—CH₂Cl | green. |

We claim:
1. A water-soluble anthraquinone dye of the formula

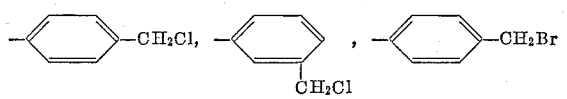

wherein:
R represents a member selected from the class consisting of ethylene, monosulfo-1,4-phenylene and monosulfo-1,3-phenylene;
Y represents a member selected from the class consisting of carbonyl and sulfonyl;
Q represents a member selected from the class consisting of —⟨ ⟩—CH₂Cl,  —⟨ ⟩(CH₂Cl),  —⟨ ⟩—CH₂Br and

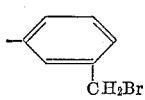

and each of *m* and *n* represents an integer of 1 to 2.

2. The dye of the formula

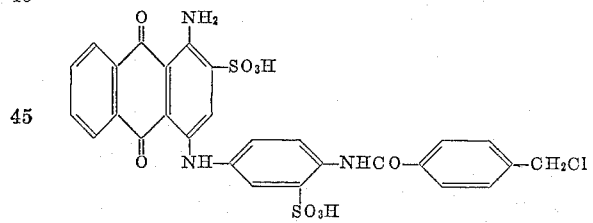

3. The dye of the formula

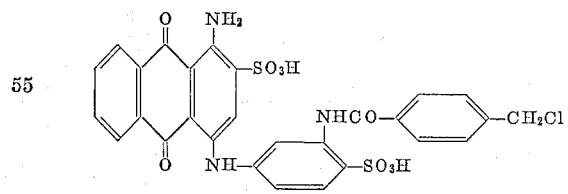

References Cited in the file of this patent
UNITED STATES PATENTS

| | | |
|---|---|---|
| 2,503,254 | Freudenberg | Apr. 11, 1950 |
| 2,544,825 | Coffey et al. | Mar. 13, 1951 |
| 2,610,194 | Jenny et al. | Sept. 9, 1952 |
| 2,662,902 | Randall et al. | Dec. 15, 1953 |
| 2,668,815 | Nawiasky | Feb. 9, 1954 |